United States Patent [19]
Keeler et al.

[11] Patent Number: 5,559,690
[45] Date of Patent: Sep. 24, 1996

[54] RESIDUAL ACTIVATION NEURAL NETWORK

[75] Inventors: James D. Keeler; Eric J. Hartman; Kadir Liano; Ralph B. Ferguson, all of Austin, Tex.

[73] Assignee: Pavilion Technologies, Inc., Austin, Tex.

[21] Appl. No.: 307,521

[22] Filed: Sep. 16, 1994

Related U.S. Application Data

[63] Continuation of Ser. No. 896,755, Jun. 10, 1992, Pat. No. 5,353,207.

[51] Int. Cl.$^6$ .......................... G05B 13/02; G06F 15/18
[52] U.S. Cl. .......................... 364/164; 364/148; 364/149; 395/23
[58] Field of Search .................... 364/148–151, 364/160–165; 395/20–24

[56] References Cited

U.S. PATENT DOCUMENTS

| | | | |
|---|---|---|---|
| 4,912,753 | 3/1990 | Evans, Jr. . | |
| 4,928,484 | 5/1990 | Peczkowski | 60/243 |
| 4,972,363 | 11/1990 | Nguyen et al. | 364/148 |
| 4,979,126 | 12/1990 | Pao et al. | 364/513 |
| 5,111,531 | 5/1992 | Grayson et al. . | |
| 5,113,483 | 5/1992 | Keeler et al. | 395/23 |
| 5,353,207 | 10/1994 | Keeler et al. | 364/164 |

FOREIGN PATENT DOCUMENTS

| | | |
|---|---|---|
| 0463934A1 | of 0000 | European Pat. Off. . |
| WO90/10270 | of 0000 | WIPO . |

OTHER PUBLICATIONS

John Moody, "Fast Learning in Multi–Resolution Hierarchies", *Yale Computer Science,* pp. 1–11.
Yann Le Cun, John S. Denker and Sara A. Solla, "Optimal Brain Damage" in *Advances in Neural Information Processing Systems 2,* edited by David S. Touretzky, 1990, pp. 598–605.
Andreas S. Weigend, David E. Rumelhart and Barnardo A. Huberman, "Generalization by Weight–Elimination with Application to Forcasting" in *Advances in Neural Information Processing Systems 3,* edited by Richard p. Lippmann, John E. Moody and David S. Touretzky, 1991, pp. 875–882.
Demetri Psaltis, Athanasios Sideris and Alan Yamamura, "Neural Controllers", IEEE First International Conference on Neural Networks, Jun. 21–24, 1987, IV–551–558.
Julio Tanomaur and Cigar Aimed, "Towards Effective Neuomorphic Controllers", ICON '91, pp. 1395–1400.
K. J. Hunt and D. Sbarbaro "Neural networks for nonlinear internal model control", *IEEE Proceedings-D,* vol. 138, No. 5, Sep. 1991, pp. 431–438.

(List continued on next page.)

*Primary Examiner*—Roy N. Envall, Jr.
*Assistant Examiner*—Thomas E. Brown
*Attorney, Agent, or Firm*—Gregory M. Howison

[57] ABSTRACT

A plant (72) is operable to receive control inputs c(t) and provide an output y(t). The plant (72) has associated therewith state variables s(t) that are not variable. A control network (74) is provided that accurately models the plant (72). The output of the control network (74) provides a predicted output which is combined with a desired output to generate an error. This error is back propagated through an inverse control network (76), which is the inverse of the control network (74) to generate a control error signal that is input to a distributed control system (73) to vary the control inputs to the plant (72) in order to change the output y(t) to meet the desired output. The control network (74) is comprised of a first network NET 1 that is operable to store a representation of the dependency of the control variables on the state variables. The predicted result is subtracted from the actual state variable input and stored as a residual in a residual layer (102). The output of the residual layer (102) is input to a hidden layer (108) which also receives the control inputs to generate a predicted output in an output layer (106). During back propagation of error, the residual values in the residual layer (102) are latched and only the control inputs allowed to vary.

9 Claims, 7 Drawing Sheets

OTHER PUBLICATIONS

D. Sbarbaro and K. J. Hunt, "A Nonlinear Receding Controller Based on Connectionist Models", *Proceedings of the 30th IEEE Conference on Decision and Control,* 1991, vol. 1, pp. 172–173.

K. J. Hunt and D. Sbarbaro, "Connectionist Approach to Non–linear Internal Model Control Using Gaussian Approximation", *Proceedings of the 1991 American Control Conference,* vol. 2, Jun. 27, 1991, pp. 1826–1827.

S. Kirkpatrick, C. D. Gelatt, M. P. Vecchi, "Optimization by Simulated Annealing", *Science,* vol. 220, pp. 671–678, (1983).

W. T. Miller, III, R. S. Sutton and Paul J. Werbos, "Neural Networks for Control," Chapters 1 (pp. 115–142) and 5 (pp. 5–58), *The MIT Press.* 1990.

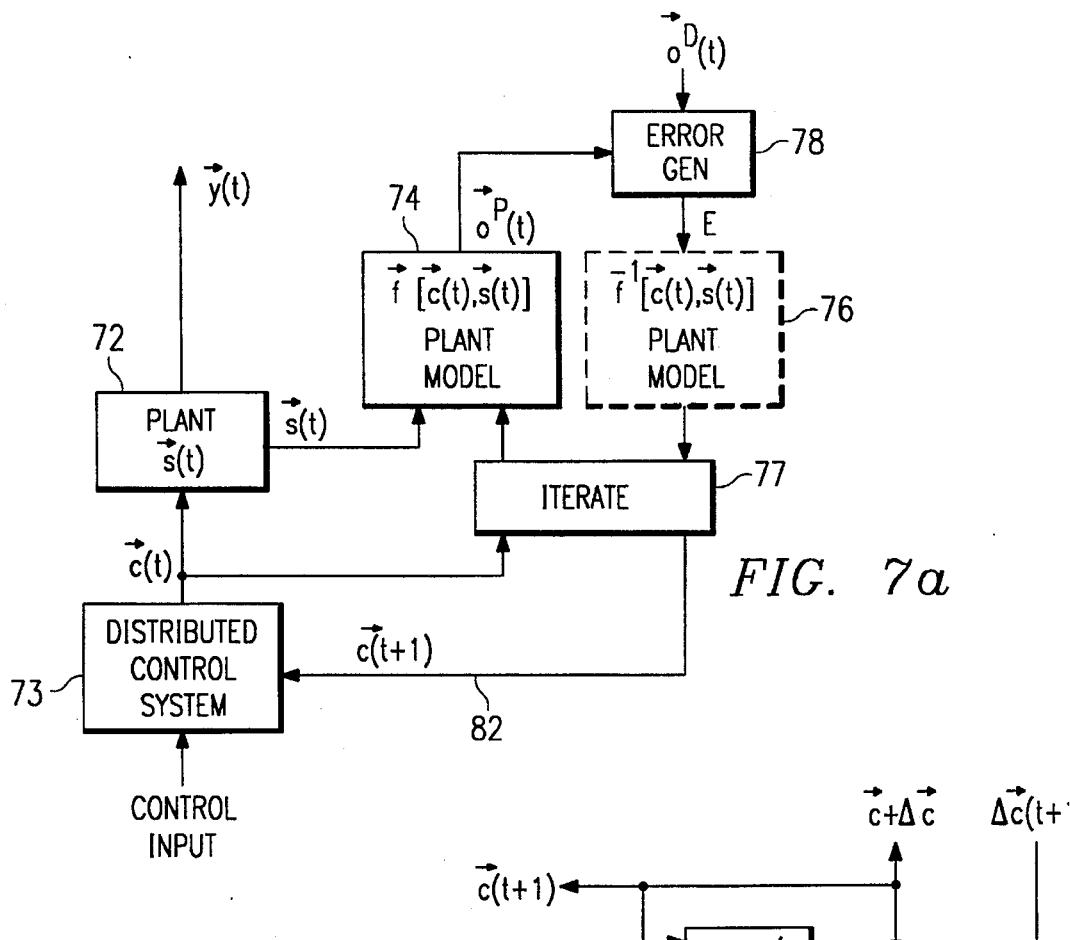
*FIG. 7a*
*FIG. 7b*
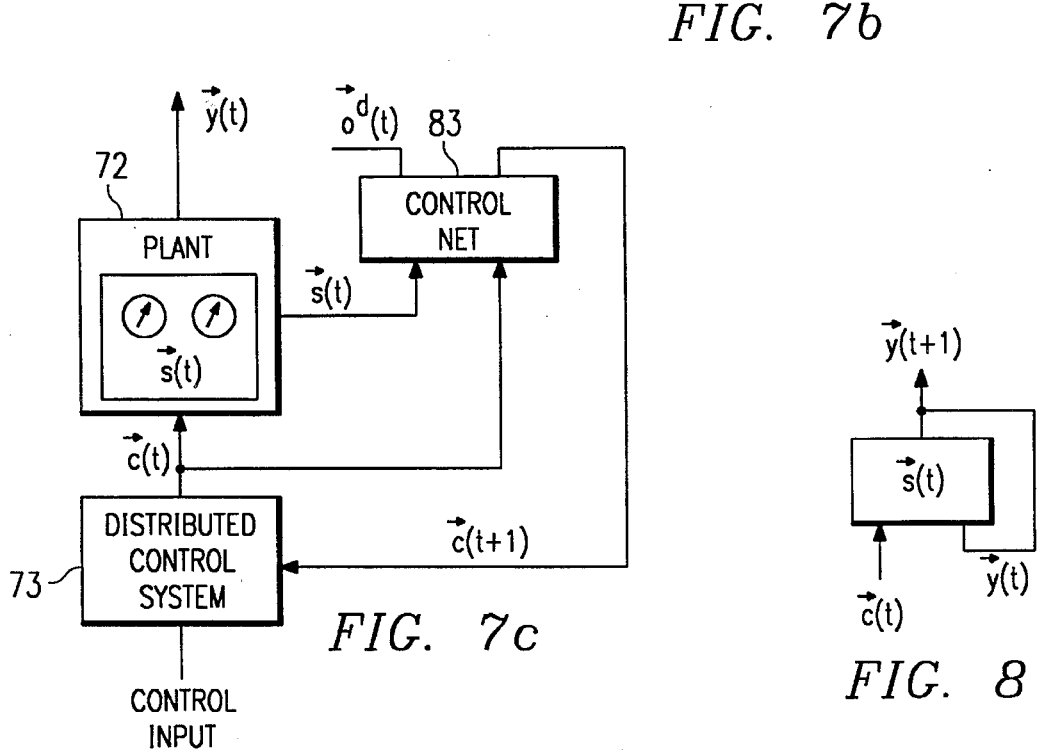
*FIG. 7c*
*FIG. 8*

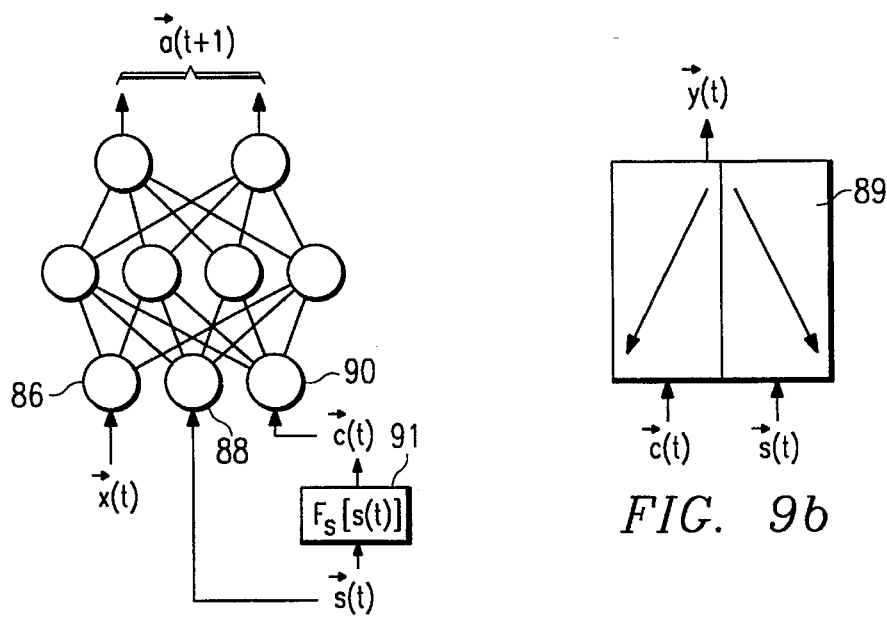
FIG. 9a
FIG. 9b
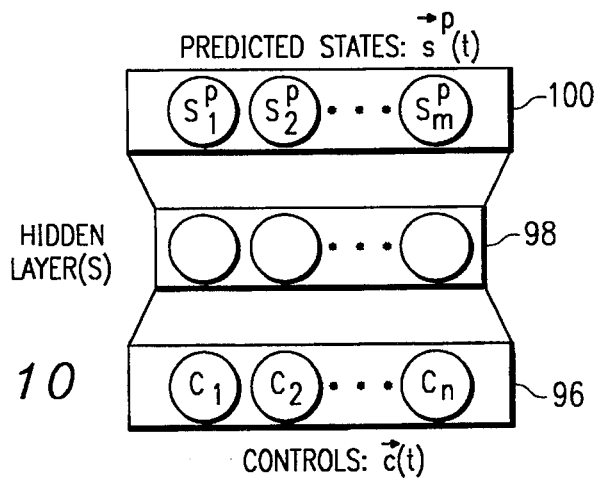
FIG. 10
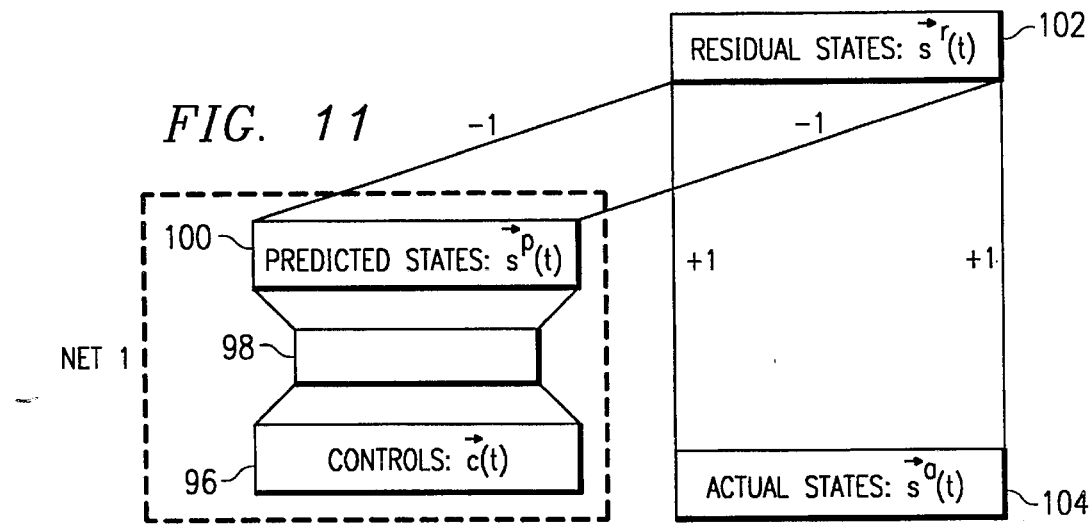
FIG. 11

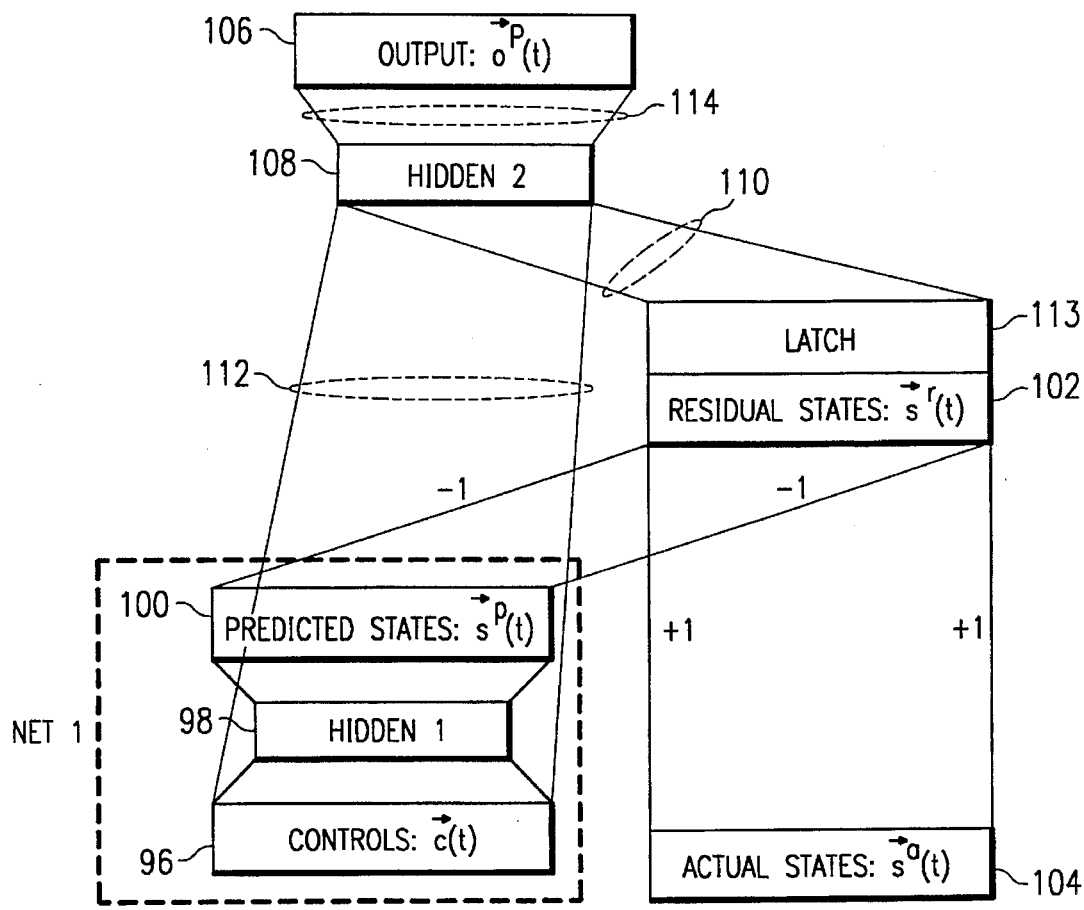
FIG. 12
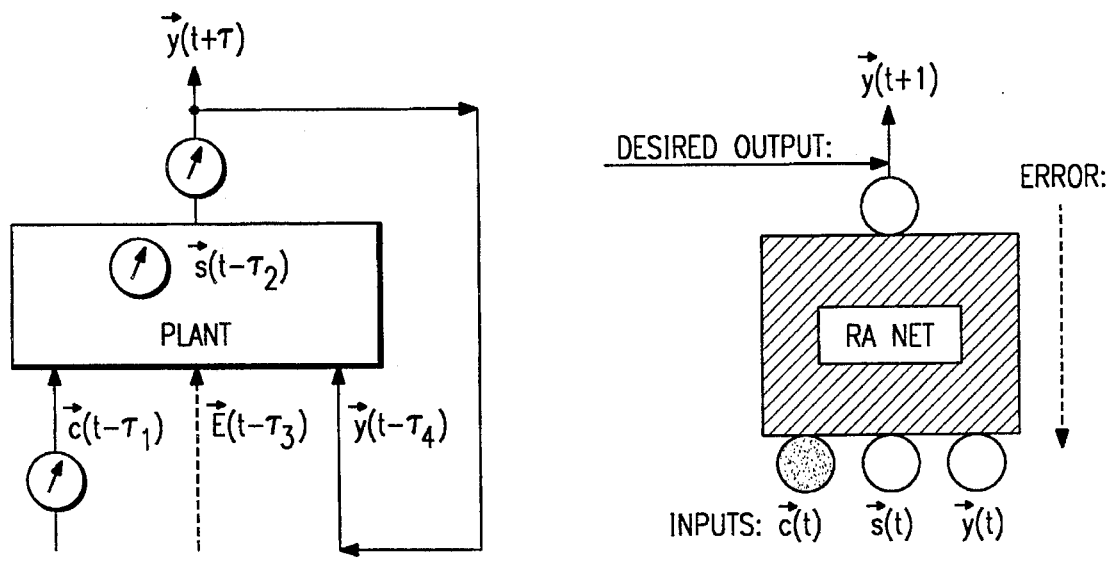
FIG. 13
FIG. 14

RESIDUAL ACTIVATION NEURAL NETWORK

This application is a continuation of application Ser. No. 07/896,755, filed Jun. 10, 1992, U.S. Pat. No. 5,353,207, issued Oct. 4, 1994, entitled "Residual Activation Neural Network".

TECHNICAL FIELD OF THE INVENTION

The present invention pertains in general to neural networks, and more particularly to a method and apparatus for improving performance and accuracy in neural networks by utilizing the residual activation in subnetworks.

BACKGROUND OF THE INVENTION

Neural networks are generally utilized to predict, control and optimize a process. The neural network is generally operable to learn a non-linear model of a system and store the representation of that non-linear model. Therefore, the neural network must first learn the non-linear model in order to optimize/control that system with that non-linear model. In the first stage of building the model, the neural network performs a prediction or forecast function. For example, a neural network could be utilized to predict future behavior of a chemical plant from the past historical data of the process variables. Initially, the network has no knowledge of the model type that is applicable to the chemical plant. However, the neural network "learns" the non-linear model by training the network on historical data of the chemical plant. This training is effected by a number of classic training techniques, such as back propagation, radial basis functions with clustering, non-radial basis functions, nearest-neighbor approximations, etc. After the network is finished learning on the input data set, some of the historical data of the plant that was purposefully deleted from the training data is then input into the network to determine how accurately it predicts on this new data. If the prediction is accurate, then the network is said to have "generalized" on the data. If the generalization level is high, then a high degree of confidence exists that the prediction network has captured useful properties of the plant dynamics.

In order to train the network, historical data is typically provided as a training set, which is a set of patterns that is taken from a time series in the form of a vector, x(t) representing the various input vectors and a vector, y(t) representing the actual outputs as a function of time for t=1, 2, 3 ... M, where M is the number of training patterns. These inputs could be temperatures, pressures, flow-rates, etc., and the outputs could be yield, impurity levels, variance, etc. The overall goal is to learn this training data and then generalize to new patterns.

With the training set of inputs and outputs, it is then possible to construct a function that is imbedded in the neural network as follows:

$$\vec{o}(t) = \vec{f}(\vec{x}(t), \vec{P}) \quad (1)$$

Where o(t) is an output vector and P is a vector or parameters ("weights") that are variable during the learning stage. The goal is to minimize the Total-Sum-Square-Error function:

$$\vec{E} = \sum_{t=1}^{M} (\vec{y}(t) - \vec{o}(t))^2 \quad (2)$$

The Total-Sum-Square-Error function is minimized by changing the parameters P of the function f. This is done by the back propagation or gradient descent method in the preferred embodiment. This is described in numerous articles, and is well known. Therefore, the neural network is essentially a parameter fitting scheme that can be viewed as a class of statistical algorithms for fitting probability distributions. Alternatively, the neural network can be viewed as a functional approximator that fits the input-output data with a high-dimensional surface. The neural network utilizes a very simple, almost trivial function (typically sigmoids), in a multi-layer nested structure. The general advantages provided by neural networks over other functional approximation techniques is that the associated neural network algorithm accommodates many different systems, neural networks provide a non-linear dependence on parameters, i.e., they generate a non-linear model, they utilize the computer to perform most of the learning, and neural networks perform much better than traditional rule-based expert systems, since rules are generally difficult to discern, or the number of rules or the combination of rules can be overwhelming. However, neural networks do have some disadvantages in that it is somewhat difficult to incorporate constraints or other knowledge about the system into the neural networks, such as thermodynamic pressure/temperature relations, and neural networks do not yield a simple explanation of how they actually solve problems.

In practice, the general disadvantages realized with neural networks are seldom important. When a neural network is used in part for optimizing a system, it is typically done under supervision. In this type of optimization, the neural network as the optimizer makes suggestions on how to change the operating parameters. The operator then makes the final decision of how to change these parameters. Therefore, this type of system usually requires an "expert" at each plant that knows how to change control parameters to make the plant run smoothly. However, this expert often has trouble giving a good reason why he is changing the parameters and the method that he chooses. This kind of expertise is very difficult to incorporate into classical models for rule-based systems, but it is readily learned from historical data by a neural network.

The general problem in developing an accurate prediction is the problem in developing an accurate model. In prediction files, there often exist variables that contain very different frequency components, or have a modulation on top of the slow drift. For example, in electronics, one may have a signal on top of a slowly varying wave of a much lower frequency. As another example, in economics, there is often an underlying slow upward drift accompanied by very fast fluctuating dynamics. In manufacturing, sensors often drift slowly, but the sensory values can change quite quickly. This results in an error in the prediction process. Although this error could be predicted given a sophisticated enough neural network and a sufficient amount of training data on which the model can be built, these are seldom practical neural network systems. As such, this error is typically discarded. This error is generally the type of error that is predictable and should be distinguished from random "noise" that is generally impossible to predict. This predictable error that is discarded in conventional systems is referred to as a "residual".

In addition to the loss of the residual prediction from the actual prediction, another aspect of the use of a neural network is that of providing optimization/control. Once a prediction has been made, it is then desirable to actually manipulate input variables which are referred to as the control variables, these being independent variables, to manipulate control input parameters to a specific set point. For example, valve positions, tank level-controllers, the accelerator pedal on a car, etc., are all control variables. In contrast, another set of variables referred to as state variables are measured, not manipulated variables, from sensors such as thermometers, flow meters, pressure gauges, speedometers, etc. For example, a control valve on a furnace would constitute the control variable, whereas a thermometer reading would constitute a state variable. If a prediction neural network were built to model a plant process based on these input variables, the same predicted accuracy would be obtained based on either the control variable or the state variable, or a combination of both.

Whenever the network is trained on input patterns, a problem occurs due to the relationship between the control valve and the thermometer reading. The reason for this is that the network will typically learn to pay attention to the temperature or the control or both. If it only pays attention to the temperature, the network's control answer is of the form "make the temperature higher" or, "make the temperature lower". As the thermometer is not a variable that can be manipulated directly, this information has to be related back to information as to how to change the controller. If the relationship between the valve and the temperature reading were a direct relationship, this might be a simple problem. However, the situations that exist in practice are typically more complex in that the state variable dependencies on the control variables are not obvious to discern; they may be multivariant non-linear functions of the controls. In order to build a proper predicted-control model to perform on-line control with no human in the loop, it is necessary for the network to account for the relationship between the control variables and the state variables.

SUMMARY OF THE INVENTION

The present invention disclosed and claimed herein comprises a control network for controlling a plant having plant control inputs for receiving control variables, associated plant state variables and one or more controlled plant outputs. Each plant output is a function of dependencies of the plant state variables on the plant control variables. A control input is provided for receiving as network inputs the current plant control variables, the current plant state variables, and a desired plant outputs. A control network output is provided for generating predicted plant control variables corresponding to the desired plant outputs. A processing system processes the received plant control variables and plant state variables through a local inverse representation of the plant that represents the dependencies of the plant output on the plant control variables to provide the predicted plant control variables necessary to achieve the desired plant outputs. An interface device is provided for inputting the predicted plant variables to the plant such that the output of the plant will be the desired outputs.

In another aspect of the present invention, the processing system is comprised of a first intermediate processing system having a first intermediate output to provide a predictive plant output. The first intermediate processing system is operable to receive the plant control variables and state variables from the control network input for processing through a predictive model of the plant to generate a predicted plant output. The predicted plant output is output from the first intermediate output and then to an error device for comparing the predicted plant output to the desired plant output and then generating an error representing the difference therebetween. A second intermediate processing system is provided for processing the error through a local inverse representation of the plant that represents the dependencies of the plant output on the plant control variables to provide the predicted plant control variables necessary to achieve the desired plant outputs.

In a further aspect of the present invention, the processing system is comprised of a residual activation neural network and a main neural network. The residual activation neural network is operable to receive the plant control variables and the state variables and generate residual states that estimate the external variances that affect plant operation. The residual activation neural network comprises a neural network having an input layer for receiving the plant control variables, an output layer for providing predicted state variables as a function of the control inputs and a hidden layer for mapping the input layer to the output layer through a representation of the dependency of the plant control variables on the state variables. A residual layer is provided for generating the difference between the predicted state variable and the actual plant state variables, this constituting a residual. The main neural network is comprised of a hidden layer for receiving the plant control variables and the residual, and an output layer for providing a predicted plant output. The main neural network has a hidden layer for mapping the input layer to the output layer with a representation of the plant output as a function of the control inputs and the residual. The main neural network is operable in an inverse mode to provide the local inverse representation of the plant with the dependencies of the control variables and the state variables projected out by the residual activation network.

BRIEF DESCRIPTION OF THE DRAWINGS

For a more complete understanding of the present invention and the advantages thereof, reference is now made to the following description taken in conjunction with the accompanying Drawings in which:

FIGS. 7a and 7b illustrate a block diagram of a control system for optimization/control of a plant's operation;

FIG. 7c illustrates a control network utilized to generate the new control variables;

FIG. 8 illustrates a block diagram of a simplified plant that is operable to estimate the value and give proper control signals to keep the output at the desired state;

FIGS. 9a and 9b illustrate a neural network showing the dependency of the control variable on the state variable and no dependencies, respectively;

FIG. 10 illustrates the first step of building the neural network;

FIG. 11 illustrates the next step in building the residual activation network;

FIG. 12 illustrates the next step in building the network, wherein the overall residual network is built;

FIG. 13 illustrates a block diagram of a chaotic plant;

FIG. 14 illustrates a block diagram of the residual activation network for controlling the plant of FIG. 13.

DETAILED DESCRIPTION OF THE INVENTION

Figure 1:
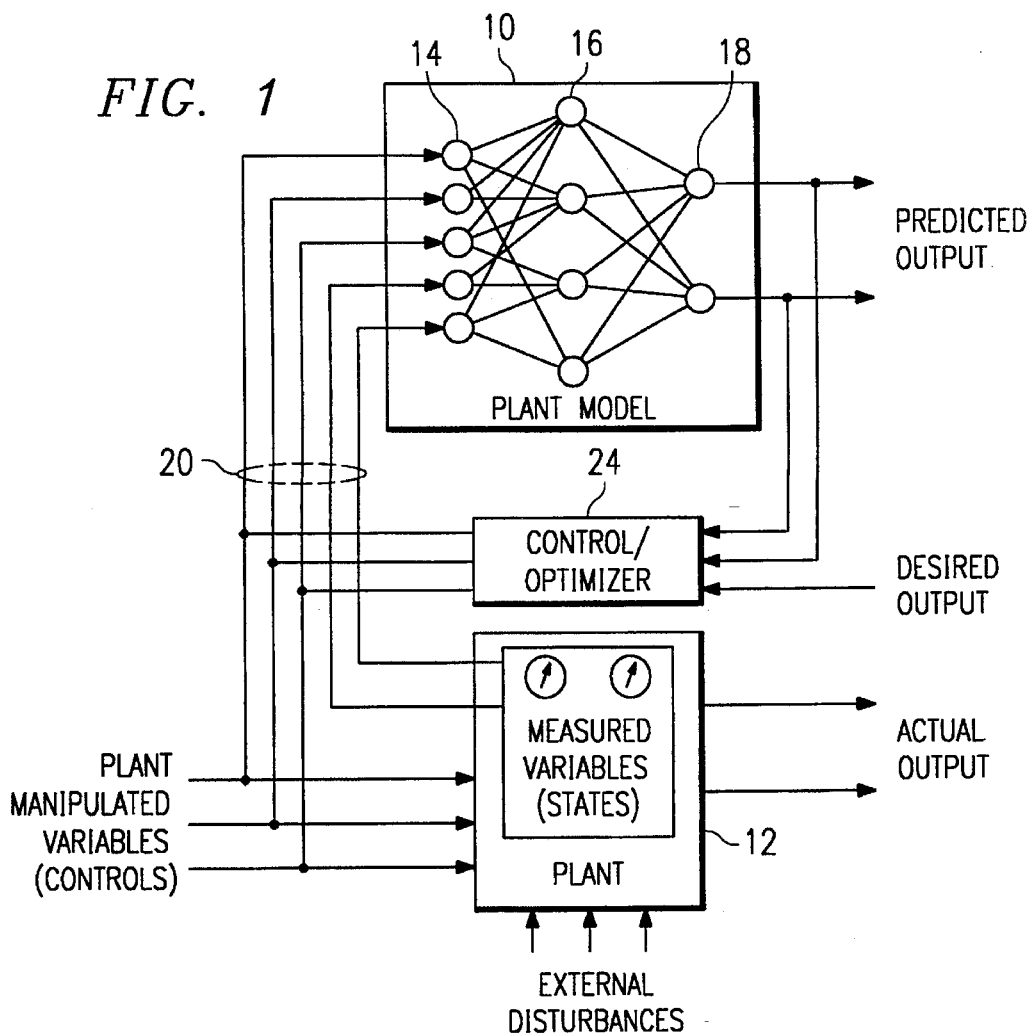
FIG. 1 illustrates a general diagram of the neural network model of a plant.

Referring now to FIG. 1, there is illustrated a diagrammatic view of a predicted model 10 of a plant 12. The plant 12 is any type of physical, chemical, biological, electronic or economic process with inputs and outputs. The predicted model is a neural network which is generally comprised of an input layer comprising a plurality of input nodes 14, a hidden layer comprised of a plurality of hidden nodes 16, and an output layer comprised of a plurality of output nodes 18. The input nodes 14 are connected to the hidden layer node 16 through an interconnection scheme that provides a non-linear interconnection. Similarly, the hidden nodes 16 are connected to the output nodes 18 through a similar interconnection scheme that is also non-linear. The input of the model 10 is comprised of an input vector 20 of known plant inputs, which inputs comprise in part manipulated variables referred to as "control" variables, and in part measured or non-manipulated variables referred to as "state" variables. The control variables are the input to the plant 12. When the inputs are applied to the plant 12, an actual output results. By comparison, the output of the model 10 is a predicted output. To the extent that the model 10 is an accurate model, the actual output and the predicted output will be essentially identical. However, whenever the actual output is to be varied to a set point, the plant control inputs must be varied. This is effected through a control block 22 that is controlled by a control/optimizer block 24. The control/optimizer block receives the outputs from the predicted model 10 in addition to a desired output signal and changes the plant inputs. This allows the actual output to be moved to the setpoint without utilizing the actual output of the plant 12 itself.

In addition to the control inputs, the plant 12 also has some unmeasured unknown plant inputs, referred to as "external disturbances", which represent unknown relationships, etc. that may exist in any given plant such as humidity, feed-stock variations, etc. in a manufacturing plant. These unknown plant inputs or external disturbances result in some minor errors or variations in the actual output as compared to the predicted output, which errors are part of the residual. This will result in an error between the predicted output and the actual output.

Figure 2:
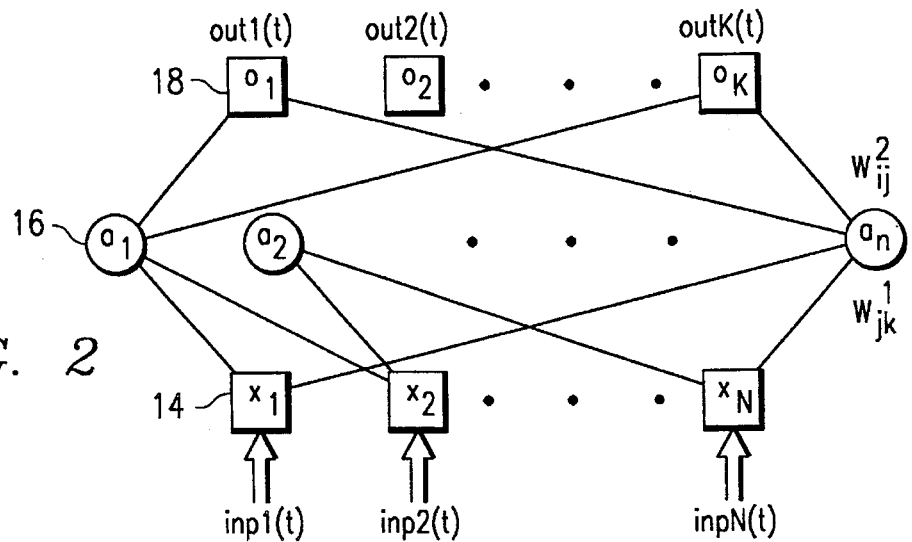
FIG. 2 illustrates a schematic view of a neural network representing a single hidden layer.

Referring now to FIG. 2, there is illustrated a detailed diagram of a conventional neural network comprised of the input nodes 14, the hidden nodes 16 and the output nodes 18. The input nodes 14 are comprised of N nodes labelled $x_1$, $x_2$, ... $x_N$, which are operable to receive an input vector $x(t)$ comprised of a plurality of inputs, INP1(t), INP2(t), ... INPN(t). Similarly, the output nodes 18 are labelled $o_1$, $o_2$, ... $o_K$, which are operable to generate an output vector $o(t)$, which is comprised of the output OUT1(t), OUT2(t), ... OUTK(t). The input nodes 14 are interconnected with the hidden nodes 16, hidden nodes 16 being labelled $a_1$, $a_2$, ... $a_n$, through an interconnection network where each input node 14 is interconnected with each of the hidden nodes 16. However, some interconnection schemes do not require full interconnect. Each of the interconnects has a weight $W_{ij}^1$. Each of the hidden nodes 16 has an output $o_i$ with a function g, the output of each of the hidden nodes defined as follows:

$$\vec{a_j} = g\left( \sum_{i=1}^{N} W_{ij}^1 x_i + b_j^1 \right) \quad (3)$$

Similarly, the output of each of the hidden nodes 16 is interconnected with substantially all of the output nodes 18 through an interconnect network, each of the interconnects having a weight $W_{jk}^2$ associated therewith. The output of each of the output nodes is defined as follows:

$$\vec{O_k} = g\left( \sum_{j=1}^{n} W_{jk}^2 a_j + b_k^2 \right) \quad (4)$$

This neural network is then trained to learn the function f() in Equation 1 from the input space to the output space as examples or input patterns are presented to it, and the Total-Sum-Square-Error function in Equation 2 is minimized through use of a gradient descent on the parameters $W_{jk}^2$, $W_{ij}^1$, $b_j^1$, $b_k^2$.

The neural network described above is just one example. Other types of neural networks that may be utilized are these using multiple hidden layers, radial basis functions, gaussian bars (as described in U.S. Pat. No. 5,113,483, issued May 12, 1992, which is incorporated herein by reference), and any other type of general neural network. In the preferred embodiment, the neural network utilized is of the type referred to as a multi-layer perception.

Prediction with Residual Activation Network

Figure 3:
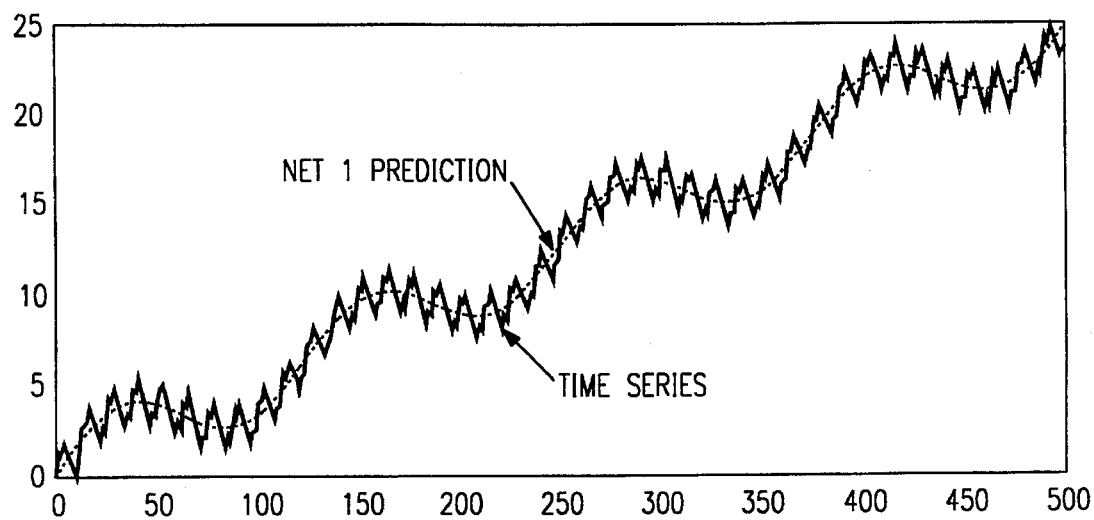
FIG. 3 illustrates a time-series output representing the first level of prediction.

Referring now to FIG. 3, there is illustrated an example of a time series that is composed of underlying signals with several different-frequencies. Often, it is difficult to discern what frequencies are important, or what scales are important when a problem is encountered. But, for this time series, there is a semi-linear component, a sign-wave component, and a high-frequency component. The time series is represented by a solid line with the x-axis representing samples over a period of time, and the y-axis representing magnitude. The time series represents the actual output of a plant, which is referred to as y(t). As will be described in more detail hereinbelow, a first network is provided for making a first prediction, and then the difference between that prediction and the actual output y(t) is then determined to define a second time series representing the residual. In FIG. 3, the first prediction is represented by a dashed line.

Figure 4:
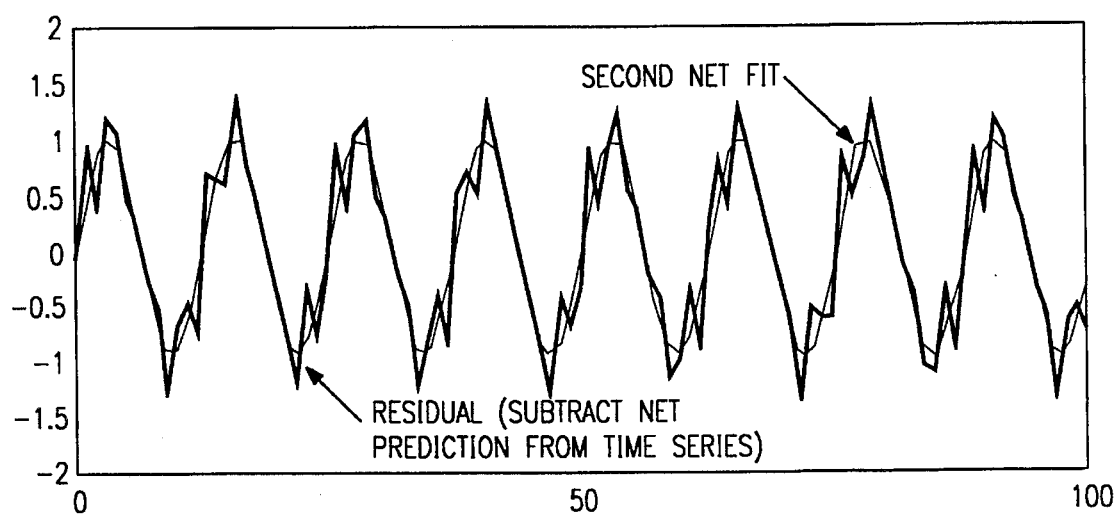
FIG. 4 illustrates the first residual from the first prediction with the second prediction of the residual.

Referring now to FIG. 4, there is illustrated a plot of the residual of the time series of FIG. 3, with the first prediction subtracted from y(t). As will also be described hereinbelow, a second separate neural network is provided, which network contains a representation of the residual after the first prediction is subtracted from y(t). By adding the prediction of this second neural network with the prediction output by the neural network of FIG. 3, a more accurate overall prediction can be made. The residual in FIG. 4 is illustrated with a solid line, whereas the prediction of the residual network is represented in a dashed line.

Figure 5:
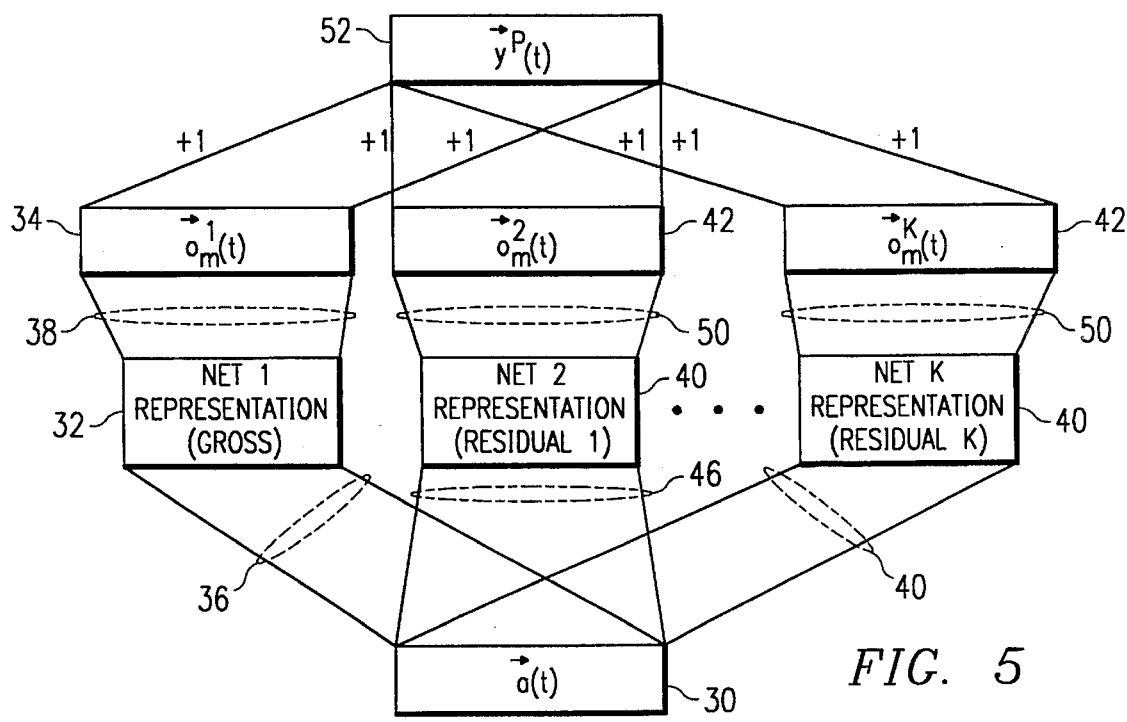
FIG. 5 illustrates a diagrammatic view of the neural network for generating the prediction utilizing residuals.

Referring now to FIG. 5, there is illustrated a diagrammatic view of the overall network representing the various levels of the residual activation network. As described above, each level of the network contains a representation of a portion of the prediction, with a first network NET 1 providing the primary prediction and a plurality of residual activation networks, NET 2–NET K, that each represent a successively finer portion of the prediction. The output of each of these networks is added together. FIG. 5 illustrates K of these networks, with each network being comprised of an input layer, one or more hidden layers, and an output layer 52. Each of the output layers is summed together in a single output layer 52 with a linear interconnect pattern.

The input layer of all of the networks NET 1–NET K is represented by a single input layer 30 that receives the input vector x(t). Multiple input layers could be utilized, one for each network. However, since the same input variables are utilized, the number of input nodes is constant. It is only the weights in the interconnect layers that will vary. Each network has the representation of the model stored in the associated hidden layers and the associated weights connecting the hidden layer to the input layer and the output layer. The primary network NET 1 is represented by a hidden layer 32, which represents the gross prediction. The hidden layer 32 is interconnected to an output layer 34 representing the output vector $o^1(t)$. An interconnect layer 36 interconnects the input layer 30 to the hidden layer 32 with an interconnect layer 38 connecting the hidden layer 32 to the output layer 34. The interconnection 36, hidden layer 32 and the interconnect 38 provide the non-linear mapping function from the input space defined by the input layer 30 to the output space defined by the output layer 34. This mapping function provides the non-linear model of the system at the gross prediction level, as will be described hereinbelow.

There are K-1 remaining residual networks, each having a hidden layer 40 with output layers 42 representing output vectors $o^2(t)$ through $o^K(t)$. The input layer 30 is connected to each of the hidden layers 40 through a separate set of interconnects 46 and the output layers 42 are each connected to the respective hidden layer 40 through a separate set of interconnects 50. Each of the hidden layers 40 and their associated interconnects 42 and 46 provide a non-linear representation or model of the residual as compared to the preceding prediction. For example, the first residual network, labelled "NET 2", represents the residual of the predicted output $o^1(t)$ in layer 34 as compared to the actual output y(t). In a similar manner, each successive residual network represents the residue of the prediction from the output layer prediction of the previous layers subtracted from y(t). Each of the models represented by the networks between the input layer 30 and each of the output layers 34 and 42 provide a non-linear mapping function. Each of the output layers 34 and 42 are then mapped into a single output layer 52, representing the predicted output $o^P(t)$, which is a linear mapping function, such that each output node in each of the output layers 34 and 42 is directly mapped into a corresponding node in layer 52 with a weight of "+1". This is a simple summing function.

Figure 6:
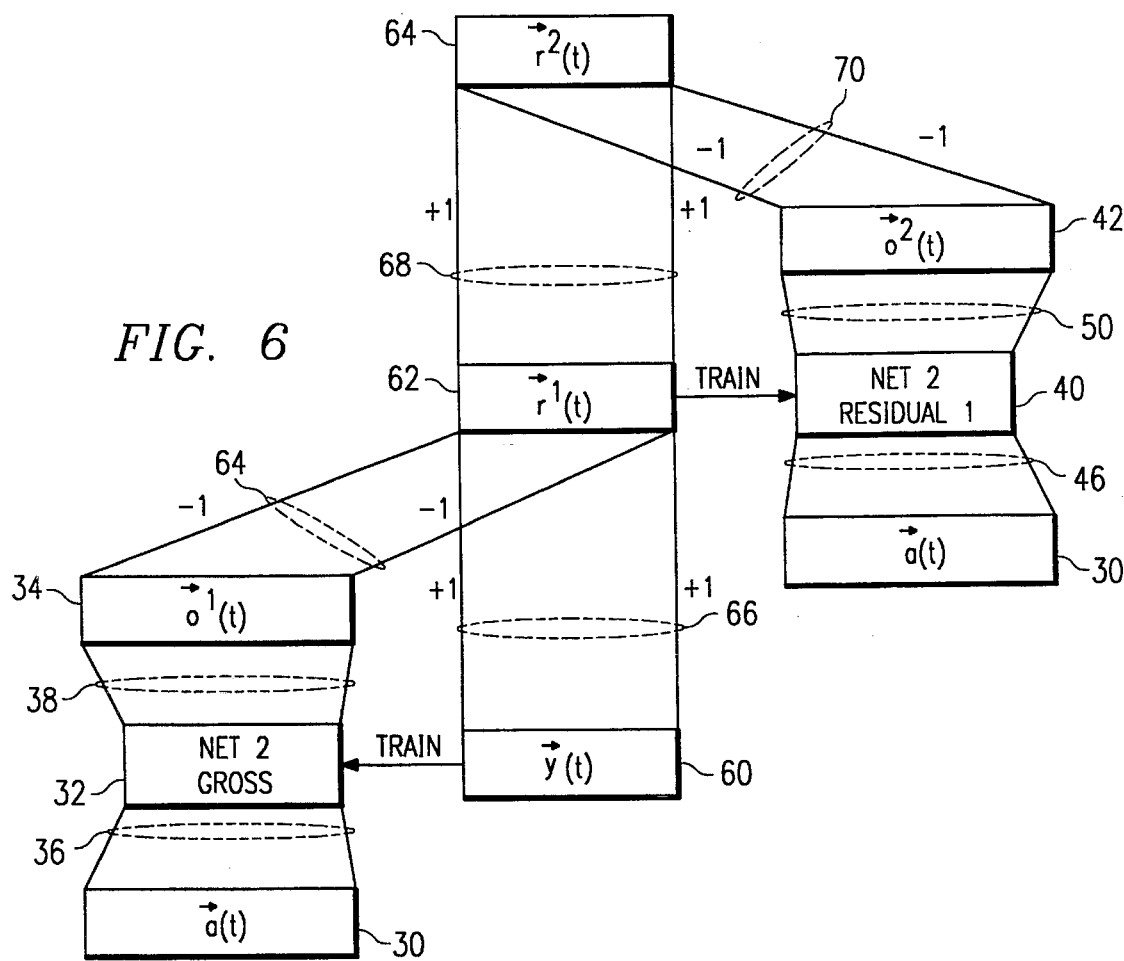
FIG. 6 illustrates the residual activation networks utilized for predicting the time series y(t)

Referring now to FIG. 6, there is illustrated a block diagram of the procedure for training the networks and storing a representation in the respective hidden layers and associated interconnection networks. Initially, the pattern y(t) is provided as a time series output of a plant for a time series input x(t). The first network, labelled "NET 1" is trained on the pattern y(t) as target values and then the weights therein fixed. This pattern is represented in a layer 60 with an arrow directed toward the hidden layer 32, representing that the hidden layer 32 is trained on this pattern as the target. Once trained, the weights in hidden layer 32 and associated interconnect layers 36 and 38 are frozen. The first network NET 1 is run by exercising the network with the time series x(t) to generate a predicted output $o^1(t)$. The output layer 34 is interconnected to a first residual layer 62 through a linear interconnect layer 64 having fixed weights of "−1". Similarly, the block 60 represents an input layer to the residual output layer 62 with an interconnect layer 66 providing interconnection and having a fixed weight of "+1". Of course, any other fixed weights could be utilized. Therefore, the residual output layer 62 represents the first residue output $r^1(t)$ that constitutes the difference between the predicted output $o^1(t)$ of the first network NET 1 and the target output y(t) or:

$$\vec{r}^1(t) = \vec{y}(t) - \vec{o}^1(t) \tag{5}$$

which could be stated as:

$$\vec{r}^k(t) = \vec{o}^{k-1}(t) - \vec{o}^k(t) \text{ where: } \vec{o}^0 \equiv \vec{y}(t) \tag{6}$$

Equations 5 and 6 represent the residual error. The residual of the $k^{th}$ network is used to train the (k+1) network, which residue is utilized to train the second network, labelled "NET 2". In the training procedure, the value of $r^1(t)$ is utilized as a target value with the input exercised with x(t). Once trained, the weights in the hidden layer 40 and associated interconnect layers 46 and 50 are frozen and then the network exercised with x(t) to provide a predicted output $o^2(t)$. This training continues with the next residual network being trained on the residual of the previous network as a target value. In this example, a residual $r^2(t)$ would first be determined in a second residual layer 64, which has as its inputs the values in the residual layer 62 interconnected to the second residual layer 64 through an interconnect layer 68, having fixed weights of "+1" and also the output of the output layer 42 interconnected through an interconnection layer 70, having fixed weights of "−1". The residual $r^2(t)$ would be defined as follows:

$$\vec{r}^2(t) = \vec{r}^1(t) - \vec{o}^2(t) \tag{7}$$

This residual in the second residual layer 64, would then be utilized to train the next network illustrated in FIG. 5. This would continue until sufficient resolution had been obtained. Once the network is trained, they are interconnected in accordance with the structure of FIG. 5, wherein the predicted output of all of the networks would be added together in the layer 52.

During training, typically, only a limited set of patterns is available. The network is trained on only a portion of those patterns, with the remainder utilized for generalization of the network. By way of example, assume that 1000 input/output patterns are available for training. During trig of the first network, only patterns representing time samples from 1 to 800 are utilized in the training procedure, with patterns from 801 through 1000 utilized to test generalization of the network to determine how accurate the prediction is. Whether or not the available set of patterns is limited to reserve some for the purpose of generalization, patterns not in the set are used to determine how accurate the prediction is. Table 1 illustrates the training procedure wherein the network labelled NET 1 is trained on the actual output y(t). From this network, a predicted output can then be obtained after the weights are fixed and then a residual calculated.

| | | | |
|---|---|---|---|
| 2 | $x_1, x_2,$ ... $x_n$ | $y_1, y_2, \ldots y_m$ | $o^1_1, o^1_2, \ldots o^1_m$ $r^1_1, r^1_2, \ldots r^1_m$ |
| 3 | $x_1, x_2,$ ... $x_n$ | $y_1, y_2, \ldots y_m$ | $o^1_1, o^1_2, \ldots o^1_m$ $r^1_1, r^1_2, \ldots r^1_m$ |
| 4 | $x_1, x_2,$ ... $x_n$ | $y_1, y_2, \ldots y_m$ | $o^1_1, o^1_2, \ldots o^1_m$ $r^1_1, r^1_2, \ldots r^1_m$ |
| . | . | . | . |
| 800 | $x_1, x_2,$ ... $x_n$ | $y_1, y_2, \ldots y_m$ | $o^1_1, o^1_2, \ldots o^1_m$ $r^1_1, r^1_2, \ldots r^1_m$ |
| . | . | . | . |
| 1000 | $x_1, x_2, \ldots x_n$ | $y_1, y_2, \ldots y_m$ | $o^1_1, o^1_2, \ldots o^1_m$ $r^1_1, r^1_2, \ldots r^1_m$ |

Table 2 illustrates the second step for training the network labelled NET 2, representing the network trained on the first residual layer $r^1(t)$. This will result in the predicted output $o^2(t)$. The residual of this network will be $r^2(t)$, which is calculated by the difference between the predicted output and the target output.

TABLE 2

| TIME | INPUT | TARGET $r(t)$ | PREDICTED OUTPUT | RESIDUAL $r(t) - o(t) = r^2(b)$ |
|---|---|---|---|---|
| 1 | $x_1, x_2,$ ... $x_n$ | $r^1_1, r^1_2,$ ... $r^1_m$ | $o^2_1, o^2_2, \ldots o^2_m$ | $r^2_1, r^2_2, \ldots r^2_m$ |
| 2 | $x_1, x_2,$ ... $x_n$ | $r^1_1, r^1_2,$ ... $r^1_m$ | $o^2_1, o^2_2, \ldots o^2_m$ | $r^2_1, r^2_2, \ldots r^2_m$ |
| 3 | $x_1, x_2,$ ... $x_n$ | $r^1_1, r^1_2,$ ... $r^1_m$ | $o^2_1, o^2_2, \ldots o^2_m$ | $r^2_1, r^2_2, \ldots r^2_m$ |
| 4 | $x_1, x_2,$ ... $x_n$ | $r^1_1, r^1_2,$ ... $r^1_m$ | $o^2_1, o^2_2, \ldots o^2_m$ | $r^2_1, r^2_2, \ldots r^2_m$ |
| . | . | . | . | . |
| 800 | $x_1, x_2,$ ... $x_n$ | $r^1_1, r^1_2,$ ... $r^1_m$ | $o^2_1, o^2_2, \ldots o^2_m$ | $r^2_1, r^2_2, \ldots r^2_m$ |
| . | . | . | . | . |
| 1000 | $x_1, x_2,$ ... $x_n$ | $r^1_1, r^1_2,$ ... $r^1_m$ | $o^2_1, o^2_2, \ldots o^2_m$ | $r^2_1, r^2_2, \ldots r^2_m$ |

Plant Optimization/Control Using a Residual-Activation Network

Referring now to FIG. 7a, there is illustrated a block diagram of a control system for optimization/control of a plant's operation in accordance with the weights of the present invention. A plant is generally shown as a block 72 having an input for receiving the control inputs c(t) and an output for providing the actual output y(t) with the internal state variables s(t) being associated therewith. As will be described hereinbelow, a plant predictive model 74 is developed with a neural network to accurately model the plant in accordance with the function f(c(t),s(t)) to provide an output $o^p(t)$, which represents the predicted output of plant predictive model 74. The inputs to the plant model 74 are the control inputs c(t) and the state variables s(t). For purposes of optimization/control, the plant model 74 is deemed to be a relatively accurate model of the operation of the plant 72. In an optimization/control procedure, an operator independently generates a desired output value $o^d(t)$ for input to an operation block 78 that also receives the predicted output $o^p(t)$. An error is generated between the desired and the predicted outputs and input to an inverse plant model 76 which is identical to the neural network representing the plant predictive model 74, with the exception that it is operated by back propagating the error through the original plant model with the weights of the predictive model frozen. This back propagation of the error through the network is similar to an inversion of the network with the output of the plant model 76 representing a $\Delta c(t+1)$ utilized in a gradient descent operation illustrated by an iterate block 77. In operation, the value $\Delta c(t+1)$ is added initially to the input value c(t) and this sum then processed through plant predictive model 74 to provide a new predicted output $o^p(t)$ and a new error. This iteration continues until the error is reduced below a predetermined value. The final value is then output as the new predicted control variables c(t+1).

This new c(t+1) value comprises the control inputs that are required to achieve the desired actual output from the plant 72. This is input to a control system 73, wherein a new value is presented to the system for input as the control variables c(t). The control system 73 is operable to receive a generalized control input which can be varied by the distributed control system 73. As will be described in more detail hereinbelow, the original plant model 74 receives the variables s(t) and the control input c(t), but the inverse plant model for back propagating the error to determine the control variable determines these control variables independent of the state variables, since the state variables cannot be manipulated. The general terminology for the back propagation of error for control purposes is "Back Propagation-to-Activation" (BPA).

In the preferred embodiment, the method utilized to back propagate the error through the plant model 76 is to utilize a local gradient descent through the network from the output to the input with the weights frozen. The first step is to apply the present inputs for both the control variables c(t) and the state variables s(t) into the plant model 74 to generate the predicted output $o^p(t)$. A local gradient descent is then performed on the neural network from the output to the input with the weights frozen by inputting the error between the desired output $o^d(t)$ and the predicted output $o^p(t)$ in accordance with the following equation:

$$\vec{\Delta c}(t) = \vec{c}(t+1) - \vec{c}(t) - \eta = \frac{\partial\, (\vec{o^d}(t) - \vec{o^p}(t))^2}{\partial(c(t))} \qquad (8)$$

where $\eta$ is an adjustable "step size" parameter. The output is then regenerated from the new c(t), and the gradient descent procedure is iterated.

As will be described hereinbelow, the inverse plant model 76 utilizes a residual activation network for the purposes of projecting out the dependencies of the control variables on the state variables. In this manner, the network 76 will pay attention to the appropriate attention to the control variables and control the plant in the proper fashion.

Referring now to FIG. 7c, there is illustrated an alternate embodiment of the control system illustrated in FIGS. 7a and 7b. In FIG. 7a, the control operation is a dynamic one; that is, the control network will receive as input the control variables and the state variables and also a desired input and output. The control variables to achieve a desired output. In the illustration of FIG. 7c, a conventional control network 83 is utilized that is trained on a given desired input for receiving the state variables and control variables and generating the control variables that are necessary to provide the desired outputs. The distinction between the control network scheme of FIG. 7b and the control network scheme of FIG. 7a is that the weights in the control network 83 of FIG. 7b are frozen and were learned by training the control network 83 on a given desired output. A desired output is provided as one input for selecting between sets of weights. Each internal set of weights is learned through training with a residual activation network similar to that described above with respect to FIG. 7a, with the desired output utilized to select between the prestored and learned weights. The general operation of control nets is described in W. T. Miller, III, R. S. Sutton and P. J. Werbos, "Neural Networks for Control", The MIT Press, 1990, which reference is incorporated herein by reference.

Another standard method of optimization involves a random search through the various control inputs to minimize the square of the difference between the predicted outputs and the desired outputs. This is often referred to as a monte-carlo search. This search works by making random changes to the control inputs and feeding these modified control inputs into the model to get the predicted output. We then compare the predicted output to the desired output and keep track of the best set of control inputs over the entire random search. Given enough random trials, we will come up with a set of control variables that produces a predicted output that closely matches the desired output. For reference on this technique and associated, more sophisticated random optimization techniques, see the paper by S. Kirkpatrick, C. D. Gelatt, M. P. Vecchi, "Optimization by Simulated Annealing". *Science*, vol. 220, 671–780 (1983), which reference is incorporated herein by reference.

Referring now to FIG. 8, there is illustrated a block diagram of a simplified plant that is operable to estimate the output y(t)=x(t+1) and give proper control signals at time t to the c(t) input to keep the output y(t) at the desired state, even though there is an external perturbation E(t). The network has available to it information regarding s(t), c(t) and y(t). y(t) is related to the control vector c(t) and the state variable vector s(t) by an equation f(). This is defined as follows:

$$\vec{y}(t) = \vec{f}(\vec{c}(t), \vec{s}(t)) \qquad (9)$$

(In these equations, we ignore time delays for simplicity.) This will be a relatively straightforward system to design by utilizing the neural network to embody the non-linear function f(). However, the state variable s(t) is related to the control variable vector c(t) by another function $f_s$ as follows:

$$\vec{s}(t) = \vec{f}(\vec{c}(t)) \qquad (10)$$

As such, if this functional dependency is not taken into account, the network will not possess the information to completely isolate the control input from the state variable input during training, as sufficient isolation is not inherently present in the neural network by the nature of the design of the neural network itself.

Referring now to FIG. 9a, there is illustrated a straightforward neural network having three input nodes, each for receiving the input vectors y(t), s(t) and c(t) and outputting y(t+1). The three input nodes are a node 86 associated with y(t), a node 88 associated with s(t) and a node 90 associated with c(t). It should be understood that each of the nodes 86–90 could represent multiple nodes for receiving multiple inputs associated with each of the vectors input thereto. A single hidden layer is shown having an interconnection matrix between the input nodes 86–90 and a hidden layer with an output layer interconnected to the hidden layer. The output layer provides the output vector y(t+1).

During training of the network of FIG. 9a, no provision is made for the interdependence between s(t) and c(t) in accordance with the function $f_s()$, which is illustrated in a block 91 external to the network. As such, during training through such techniques as back propagation, problems can result. The reason for this is that the inversion of the input/output function $f_s()$ is singular for correlated variables. In this training, the network is initialized with random weights, and then it randomly learns on an input pattern and a target output pattern, but this learning requires it to pay attention to either the state variables or the control variables or both. If it only pays attention to the state variable input, the network's control answer is of the form "vary the state variable". However, the state variable is not a variable that can be manipulated directly. It has to be related back to how to change the controller. If this is a simple function, as defined by the function $f_s()$, it may be a relatively easy task to accomplish. However, if it is a more complex dependency that is not obvious to discern, there may be multi-variate non-linear functions of these control inputs. In performing on-line control (where there is no human in the loop), it is desirable to have the state information translated automatically to control information.

According to the present invention, the neural network is configured such that the interdependence between the control variables c(t) and the state variables s(t) is properly modeled, with the neural network forced to pay attention to the control variables during the learning stage. This is illustrated in FIG. 9b, wherein a network 89 is illustrated as having the state variables and control variables isolated. Once isolated, the BPA operation will pay maximal attention to the control variables. This is achieved by projecting out the dependencies of the control variables on the state variables.

Referring now to FIG. 10, the first step of building the neural network is to model the function $f_s()$ as defined in Equation 10. A neural network is formed having an input layer 96, a hidden layer 98 and an output layer 100. The input layer receives as inputs the controls c(t) in the form of inputs $c_1, c_2, \ldots c_n$, with the output layer representing the predicted state variables $s^p(t)$, comprising the outputs $s_1^P$, $s_2^P, \ldots s_m^P$. The neural network of FIG. 10 is trained by utilizing the state variables as the target outputs with the control input c(t) and, with back propagation, fixing the weights in the network to provide a representation of the function $f_s()$ of Equation 10. This, therefore represents a model of the state variables from the control variables which constitutes dependent or measured variables versus independent or manipulated variables. This model captures any dependencies, linear, non-linear or multi-variant of the state variables on the control variables. As will be described hereinbelow, this is an intermediate stage of the network. Although only a single hidden layer was shown, it should be understood that multiple hidden layers could be utilized.

Referring now to FIG. 11, there is illustrated the next step in building the residual activation network. A residual output layer 102 is provided for generating the residual states $s^r(t)$. The residual states in layer 102 are derived by a linear mapping function of the predicted states $s^p(t)$ into the residual state layer 102 with fixed weights of "−1", and also linearly mapping the input state variables s(t) from an input layer 104 into the residual layer 102, with the states in the layer 104 being termed the actual states $s^a(t)$. The linear mapping function has fixed weights of "+1". Therefore, the residual state layer would have the following relationship:

$$\vec{s}^r(t) = \vec{s}^a(t) - \vec{s}^p(t) \qquad (11)$$

The residual states $s^r(t)$ in layer 102 are calculated after the weights in the network labelled NET 1 are frozen. This network is referred to as the "state prediction" net. The values in the residual layer 102 are referred to as the "residual activation" of the state variables. These residuals represent a good estimation of the external variables that affect the plant operation. This is important additional information for the network as a whole, and it is somewhat analogous to noise estimation in Weiner and Kahlman filtering, wherein the external perturbations can be viewed as noise and the residuals are the optimal (non-linear) estimate of this noise. However, the Kahlman filters are the optimal linear estimators of noise, as compared to the present system which provides a non-linear estimator of external influences.

Referring now to FIG. 12, there is illustrated the next step in building the network, wherein the overall residual network is built. The output of the residual layer 102 s'(t) represents f(E(t)), where E(t) comprises the extraneous inputs that cannot be measured. Such extraneous inputs could be feed stock variations of chemical processes, etc. The overall residual network is comprised of a network wherein the inputs are the control inputs c(t) and the residual s'(t). Therefore, the input layer 96 and the input layer 104 are mapped into an output layer 106, with a hidden layer 108. The hidden layer 108 being interconnected to the residual layer 102 through an interconnection network 110 and interconnected to the input layer 96 through an interconnection network 112. The hidden layer 108 could also be mapped to the output layer, although not shown in this embodiment. Layer 108 is mapped into output 106 through interconnection network 114. Therefore, the mapping of both the control input layer 96 and the residual layer 102 to the output layer 106 provides a non-linear representation, with this non-linear representation trained on a desired output pattern with the input comprising the control input pattern c(t) and the residual states s'(t). An important aspect of the present invention is that, during back propagation of the error through BPA, in accordance with the optimization/control configuration illustrated in FIG. 7a, the network effectively ignores the state variables and only provides the c(t+1) calculation via model inversion (BPA). Since the residuals are functions that do not change when the control changes, i.e., they are external parameters, these should not change during the prediction operation. Therefore, when the prediction of the control changes is made, the residual states are effectively frozen with a latch 113 that is controlled by a LATCH signal. The procedure for doing this is to initially input the control c(t) and state variables s(t) into the input layer 96 and input layer 104, respectively, to generate the predicted output $o^p(t)$. During this operation, the values in the residual layer 102 s'(t) are calculated. The latch is set and these values are then clamped for the next operation, wherein the desired output $o^d(t)$ is generated and the error between the desired output and the predicted output is then propagated back through the network in accordance with Equation 7. The back propagation of this error is then directed only toward the controls. The controls are then changed according to gradient descent, control nets, or one of the other methods described hereinabove with reference to FIG. 7a, completing on cycle in the BPA process. These cycles continue with the s'(t) now latched, until the output reaches a desired output or until a given number of BPA iterations has been achieved. This procedure must be effected for each and every input pattern and the desired output pattern.

By freezing the values in the residual state s'(t), the dependencies of the controls on the state variables have been projected out of the BPA operation. Therefore, the residual-activation network architecture will be assured of directing the appropriate attention to the controls during the BPA operation to generate the appropriate control values that can help provide an input to the distributed control system that controls the plant.

By way of example, if one of the controls is a furnace valve, and one of the states is a temperature, it will be appreciated that these are highly correlated variables, such that when the prediction of the temperature from the control in NET 1, represented by input layer 96, hidden layer 98 and output layer 100, would be quite accurate. Hence, when the actual temperature of a state variable 1 is subtracted from the predicted temperature, the residual is quite small. Thus, any control signal will go directly to the control and not to the state, constituting a significant benefit of the present invention. Additionally, the residual is, in fact, that part of the temperature that is not directly dependent on the controls, e.g. due to the ambient air temperature, humidity, or other external influences. When the prediction network is built, the outputs will now be a direct function of the controls and possibly these external variations, with the residual activation network of the present invention compensating for external perturbations, via a non-linear estimation of these perturbations.

Referring now to FIG. 13, there is illustrated a block diagram of a chaotic plant. In this example, the task is to estimate y(t+1) and give the proper control signal at time t to c(t) to keep the output x(t) at the desired state, even though there is an external perturbation E(t). However, it should be understood that the neural network model does not directly receive information about E(t). The residual activation network that receives the inputs c(t), s(t) and y(t) and outputs the predicted value y(t+1) while receiving the desired output, with the error propagated back through the network to generate the full values is illustrated in FIG. 14. The output variables y(t) are functions of the control variables c(t), the measured state variables s(t) and the external influences E(t), which can be stated as follows:

$$\vec{y}(t) = \vec{f}(\vec{c}(t), \vec{s}(t), \vec{E}(t)) \tag{12}$$

The Equation f() is assumed to be some uncomplicated non-linear unknown function which to be modeled by the network. The task is to obtain the best approximation of this function f() by learning from measured data. The assumption is made that the measured state variables s(t) are some other unknown function of the controls c(t) and the external perturbations E(t) which would have the following relationship:

$$\vec{s}(t) = \vec{f}_s(\vec{c}(t), \vec{E}(t)) . \tag{13}$$

The function $f_s()$ represents the non-linear unknown function of the dependency of the state variables s(t) on both the control variables s(t) and the external perturbations E(t). Without loss of generality, this function can be expanded in the following form:

$$\vec{f}_s(\vec{c}(t), \vec{E}(t)) = \vec{f}_c(\vec{c}(t)) + \vec{f}_E(\vec{E}(t)) + f_{cE}() \tag{14}$$

Where $f_c()$ depends only on c(t) and $f_E()$ depends only on E(t).

It is assumed that the magnitude of $f_c()$ and $f_E()$ are large compared to the higher order terms, $f_{cE}() + \ldots$; most of the dependencies of the states on the controls can be projected out by learning the states from the controls. The state-variables prediction can be written as a function of the controls, $s^p(c(t)) = f_{ps}(c(t))$. It is also assumed that the external variations in the controls are not highly correlated, hence he learned function, $f_{ps}(c(t))$ will be very close to $f_c(c(t))$, since this is assumed to be the dominant term in the equation. Thus, the following approximate equality will exist:

$$\vec{f}_{ps}(\vec{c}(t)) = \vec{f}_c(\vec{c}(t)) = \vec{f}_c(\vec{c}(t)) + \epsilon(\vec{c}(t), \vec{E}(t)) \quad (15)$$

where the error $\epsilon$ is small compared to $f_E(E(t))$.

Since the predicted model $f_{ps}(c(t))$, the residuals can then be calculated as follows:

$$\vec{r}(\vec{E}(t), \vec{c}(t)) = \vec{s}(t) - \vec{s}_p(t) \quad (16)$$

Substituting, the following is obtained:

$$\vec{r}(\vec{E}(t)\vec{c}(t)) = \vec{f}_c(\vec{c}(t)) + \vec{f}_E(\vec{E}(t)) + \vec{f}_{cE}(\vec{c}(t), \vec{E}(t)) + \ldots - \vec{f}_c(c(t)) - \epsilon(\vec{c}(t), \vec{E}(t)) \quad (17)$$

Reducing this, the following relationship will be obtained:

$$\vec{r}(\vec{E}(t)\vec{c}(t)) = \vec{f}_E(\vec{E}(t)) + \vec{f}_{cE}(\vec{c}(t), \vec{E}(t)) + \ldots - \epsilon(\vec{c}(t), \vec{E}(t)) \quad (18)$$

The c(t) and E(t) dependencies are then grouped into a single term $\eta(c(t), E(t))$ as follows:

$$\vec{r}(\vec{E}(t)\vec{c}(t)) = \vec{f}_E(\vec{E}(t)) + \eta(\vec{c}(t), \vec{E}(t)) \quad (19)$$

where, by the above assumptions, $\eta(c(t), E(t))$ is expected to be smaller in magnitude as compared to $f_E(E(t))$.

In the above manner, the majority of the dependencies of the state variables on the controls have been projected out of the network operations, but the useful information that is captured by the measured state variables, and that implicitly contains the external disturbances, is not discarded. Note that since the neural network learning state variable predictions can learn non-linear functions, this is a fully general non-linear projection to $f(c(t))$. Furthermore, by calculating the residuals, an excellent estimation of the external variations has been provided.

The residuals in the above described example were calculated via a simple subtraction. However, multiplicative and higher-order terms could exist in the expansion and, as such, another projection operator would be required to capture these terms. To achieve this, we would examine the term $\eta(c(t), E(t))$ in a manner totally analogous to the previous term. That is, whereas the first-order dependencies of the control variables were subtracted, the same methodology can be applied to capture the higher-order terms. As an example, consider the term $\eta(c(t), E(t))$ which has no first-order dependencies on c(t) and E(t), such that the next highest order is second-order. The function can be written in the following form:

$$\eta(c, E) = A\eta_c(c)\eta_E(E) + B[c^3; c^2E; cE^2; E^3] + \ldots \quad (20)$$

Figure 15:
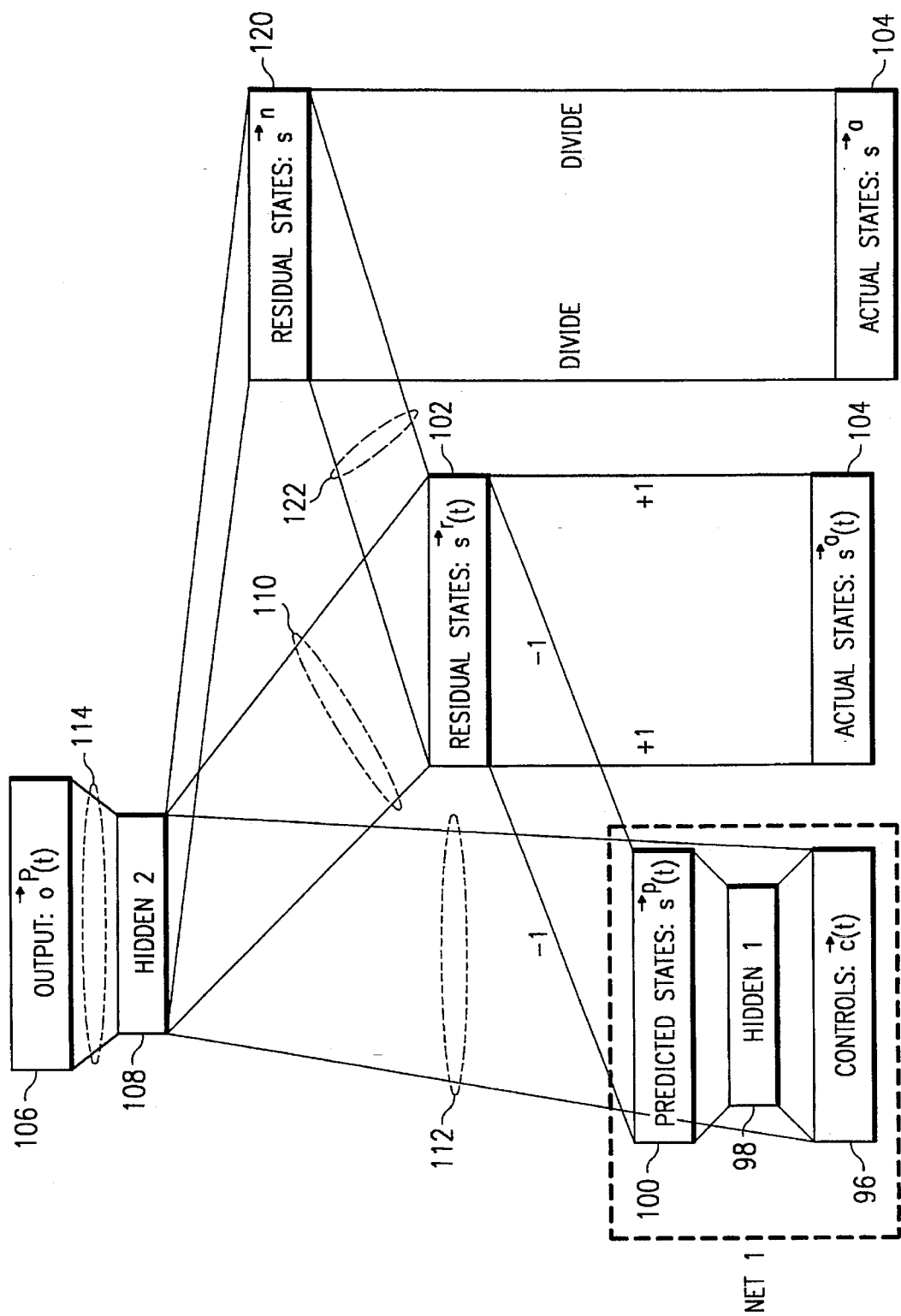
FIG. 15 illustrates a diagrammatic view of a generalized residual activation network.

Whereas these dependencies cannot be separated term-by-term as described above, the higher-order information can be provided, for example, by dividing $\eta(c(t), E(t))$ by the actual states. This, together with the substraction (above), will provide two independent estimates of the external perturbation, and the neural network can build a better model from the combination of these estimates. An example of this architecture is illustrated in FIG. 15. The same higher-order generalizations can be applied for the prediction residual activation networks, namely taking divisions, etc., of the activations before further modeling.

In summary, there has been provided a residual activation network that allows dependencies of the controls on the state variables to be projected out. Once projected out, Back Propagation-to-Activation control can be utilized to achieve control and be assured that the network pays appropriate attention to the controls. The network is comprised of two networks, a first network for modeling the dependencies of the state variables on the controls and developing a residual value. The control inputs and residual values are then input to a second network to provide a predicted output for the plant. A desired output is then determined and combined with the predicted output for a given set of input control variables in order to generate an error. This error is back propagated through the control network with the predicted model therein frozen. Further, this back propagation of error is performed with the residual values frozen, such that only the control inputs are varied. This procedure is iterative. The resulting control inputs are then input to the plant control system to effect changes in the input to the plant to achieve the desired output.

Although the preferred embodiment has been described in detail, it should be understood that various changes, substitutions and alterations can be made therein without departing from the spirit and scope of the invention as defined by the appended claims. For example, instead of BPA, the residual net can be inverted via control nets as described in FIG. 7a or via a Monte-Carlo Search through the space of control inputs until the desired output is achieved, or through simulated annealing of the inputs, or any combination thereof.

What is claimed is:

1. A network for predicting plant outputs of a plant and for receiving control variables that are used to control the plant and measurable state variables of the plant, with the measurable state variables having dependencies on the control variables and unmeasurable external influences, the control network for projecting out the dependencies of the measurable state variables on the control variables, comprising:

a residual activation neural network for generating an estimation of the unmeasurable external influences on the plant and having:
  an input layer for receiving the control variables,
  an output layer for outputting predicted state variables,
  a hidden layer for mapping said input layer to said output layer through a representation of the dependencies of the state variables on the control variables to generate said predicted state variables, which said representation is trained on the measurable state variables, and
  a residual layer for determining as a residual the difference between said predicted state variables and the input state variables, said residual comprising an estimation of the unmeasurable external influences on the plant; and a main neural network having:
  an input layer for receiving as inputs the control variables and input signals parameterized by said residual,
  an output layer for outputting a predicted plant output, and
  a hidden layer for mapping said input layer to said output layer through a representation of the plant as a function of the control variables and said residual.

2. The network of claim 1, and further comprising:

means for generating an error between the predicted plant output and a desired plant output;

a latch for latching said residual in said input layer of said main neural network; and means for operating said main neural network to provide the inverse of said associated representation and back propagate said error through said main neural network from said output layer to the control variable inputs of said input layer of said main neural network to generate predicted control variable change values necessary to achieve said desired plant output.

3. The control network of claim 2, wherein said means for generating said error comprises:

a predictive model neural network for providing a representation of the plant and for receiving the control variables and the measurable state variables as inputs and predicting the output of the plant as a predicted plant output; and a difference device for receiving said desired plant output and said predicted plant output and generating said error.

4. The control network of claim 2, wherein said means for back propagating error through said main neural network comprises means for back propagating error through said main neural network to define said predicted control variable change values, and iteratively summing said change values with the control variables to minimize said error in accordance with a back propagation-to-activation technique.

5. The control network of claim 1, wherein said representation stored in said residual activation network is a non-linear representation of the dependency of the state variables on the control variables and the representation in said hidden layer of said main neural network comprises a non-linear representation of the plant output as a function the measurable state variables having dependencies on both the control variables and unmeasurable external influences of the input control variables and said residual.

6. A predictive network for predicting the operation of a plant in response to receiving manipulatable control variables that are input to the plant and non-manipulatable measurable state variables output by the plant, comprising:

a residual network for projecting out the dependencies of the state variables on the control variables to generate an estimation of the unmeasurable external influences on the plant and having:
an input for receiving input control variables,
an output for outputting predicted state variables as a function of the input control variables,
a residual processing system for processing the input control variables through a representation of the dependencies of the state variables on the control variables to provide predicted state variables for output by said output, which representation was trained on the control variables as inputs and measurable state variables as target outputs, and
a residual layer for determining the difference between the input measurable state variables and the predicted state variables, the difference comprising a residual, said residual comprising the estimation of the unmeasurable external influences on the plant; and a main network having:
an input for receiving as inputs the input control variables and said residual,
an output for outputting a predicted output representing the predicted output of the plant, and
a main processing system for processing the input control variables and said residual through a representation of the plant as a function of the control variables and an input signal parameterized by said residual.

7. The predictive network of claim 6 wherein said input, said output and said processing system of said residual network comprise a residual neural network having:

an input layer for receiving the input control variables;

an output layer for outputting said predicted state variables; and a hidden layer for mapping said input layer to said output layer through a non-linear representation of the dependencies of the state variables on the control variables.

8. The predictive network of claim 6 wherein said main network comprises a main neural network having:

an input layer for receiving the input control variables and said signal parameterized by said residual that is output by said residual layer;

an output layer for outputting said predicted output representing the predicted output of the plant; and a hidden layer for mapping said input layer to said output layer through a non-linear representation of the plant as a function of the control variables and said signal parameterized by said residual.

9. The predictive network of claim 8 wherein said main network has the hidden layer thereof trained through back propagation as a function of known input control variables and residuals from said residual layer, said residuals generated by said residual network, and said output layer of said main network having input thereto known target predicted outputs.

* * * * *

UNITED STATES PATENT AND TRADEMARK OFFICE
CERTIFICATE OF CORRECTION

PATENT NO. : 5,559,690

DATED : September 24, 1996

INVENTOR(S) : Keeler, et al.

It is certified that error appears in the above-identified patent and that said Letters Patent is hereby corrected as shown below:

Column 6, line 35, delete "different-frequencies", and insert therefor --different frequencies--;

Column 8, line 56, delete "trig", and insert therefor --training--.

Signed and Sealed this

Eighteenth Day of November 1997

Attest:

Attesting Officer

BRUCE LEHMAN

Commissioner of Patents and Trademarks